US 6,544,118 B2

(12) United States Patent
Schwersmann

(10) Patent No.: US 6,544,118 B2
(45) Date of Patent: Apr. 8, 2003

(54) SELF-PROPELLED COMBINE HARVESTER HAVING ASYMMETRIC TRANSACTION HOUSINGS

(75) Inventor: Berthold Schwersmann, Bad Iburg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/838,739

(22) Filed: Apr. 19, 2001

(65) Prior Publication Data

US 2002/0045469 A1 Apr. 18, 2002

(30) Foreign Application Priority Data

Apr. 19, 2000 (DE) .......................... 100 19 640

(51) Int. Cl.[7] .......................... A01F 12/40; A01F 12/44; A01F 7/06
(52) U.S. Cl. .......................... 460/80; 460/16
(58) Field of Search .......................... 460/16, 80, 113, 460/78, 110, 66, 69, 112; 56/14.6, 14.5

(56) References Cited

U.S. PATENT DOCUMENTS

| 4,291,709 A | * | 9/1981 | Weber et al. .................. 460/70 |
| 4,611,605 A | * | 9/1986 | Hall et al. ..................... 460/80 |
| 4,739,773 A | * | 4/1988 | West et al. .................... 460/16 |
| 4,875,890 A | * | 10/1989 | Margerum et al. ............ 460/68 |
| 5,078,646 A | * | 1/1992 | Class et al. .................... 460/69 |
| 5,556,337 A | * | 9/1996 | Tophinke et al. ............. 460/70 |
| 6,129,629 A | * | 10/2000 | Dammann et al. ............ 460/67 |
| 6,231,439 B1 | * | 5/2001 | Heidjann ...................... 460/80 |

FOREIGN PATENT DOCUMENTS

| DE | 20 00 605 | 7/1970 |
| DE | 36 01 359 | 6/1992 |
| DE | 696 13 379 | 3/1997 |
| DE | 197 22 793 | 12/1998 |

* cited by examiner

Primary Examiner—Thomas B. Will
Assistant Examiner—Árpád Fábián Kovács
(74) Attorney, Agent, or Firm—Husch & Eppenberger, LLC; Robert E. Muir; Richard J. Musgrave

(57) ABSTRACT

A self-propelled combine harvester having a threshing device, main threshing drum and feed drum for transferring crop to an axial dividing device. The axial dividing device has two housings that are asymmetrical and expand vertically and horizontally at their inlet ends to ensure uniform and trouble-free transfer of the harvested crop to the dividing device.

16 Claims, 4 Drawing Sheets

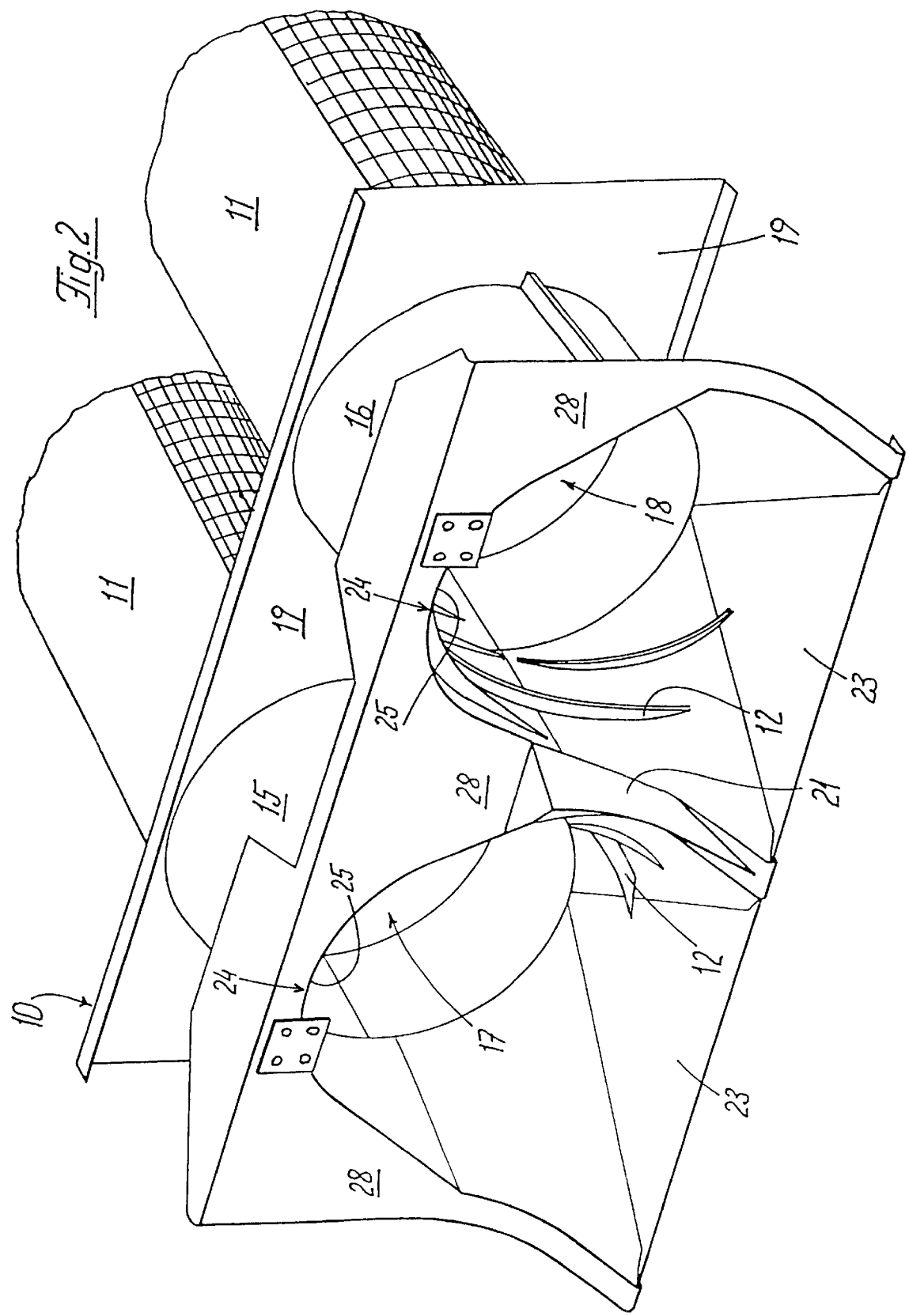

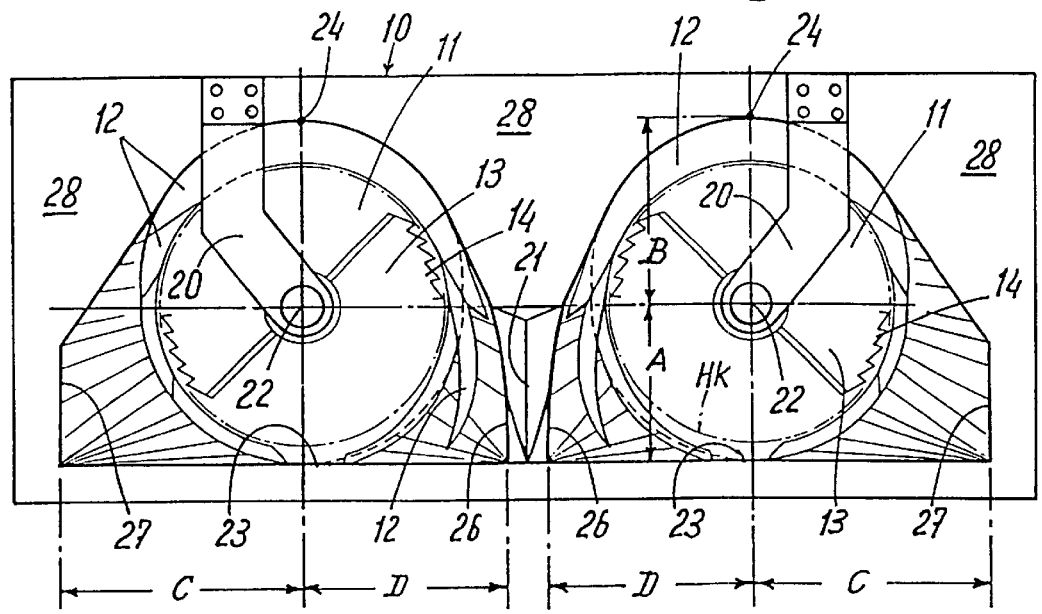
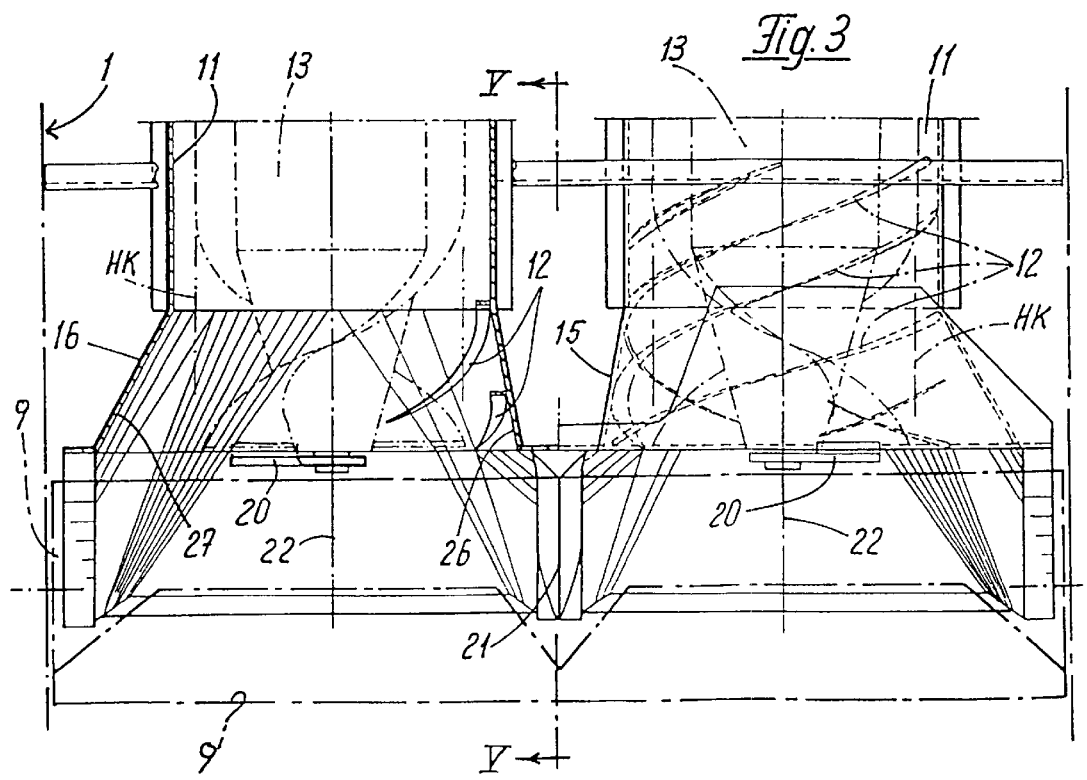

SELF-PROPELLED COMBINE HARVESTER HAVING ASYMMETRIC TRANSACTION HOUSINGS

TECHNICAL FIELD OF THE INVENTION

The invention relates to harvesting equipment, and more specifically to a self-propelled combine harvester having asymmetric transition housings.

BACKGROUND OF THE INVENTION

German Patents DE 36 01 359 C2 and DE 20 00 605 A1 describe self-propelled combine harvesters having a front crop attachment with a feed rake to harvest crop. The harvested crop is then passed through an axial-flow type threshing and/or dividing device having two threshing and/or dividing housings incorporating guide elements in both the vertical and horizontal direction with symmetrically mounted rollers and a matching inlet and outlet associated therewith. This construction is problematic because the maximum possible diameter of the dividing housing is limited due to limited amounts of available space and/or because of the support members.

These combine harvesters have certain vertical and horizontal spatial dimensions that cannot be exceeded. These limitations lead to the dividing housings being spaced both from one another and also from the lateral boundaries of the body of the machine. To transfer crop from the tangential threshing mechanism to the two dividing housings, a transfer drum having guide elements is used to transfer the crop stream to the axial dividing housings.

In practice, however, it has become apparent that the transfer of the crop or the acquisition thereof by the dividing rotors does not function properly under all harvesting conditions. For example, newer combine harvesters have greater throughputs that cause the unsatisfactory functioning. The abrupt change in the crop stream direction directly prior to entry into the two dividing housings, both in the central region and the two side regions thereof are the reason for this unsatisfactory functioning.

The present invention is directed to overcoming one or more of the problems set forth above.

SUMMARY OF THE INVENTION

An aspect of the invention is to provide a combine harvester having asymmetrical transition housings for improving the transfer of harvested crop from a tangential threshing device to an axial dividing device incorporating two mutually parallel dividing housings in a satisfactory manner.

Another aspect of this invention is to provide a combine harvester having two asymmetrical transition housings, wherein the asymmetrical transition housings expand vertically and horizontally.

In still another aspect of this invention there is a combine harvester having two asymmetrical transition housings, wherein the two asymmetrical transition housings expand vertically and horizontally taken with reference to the rotational axis of the dividing rotors, and wherein a common frontal dividing wedge is associated with the two asymmetrical transition housings to facilitate the crop stream and to eliminate the abrupt changes in directions of said crop stream.

In still another aspect of this invention there is a combine harvester having two asymmetrical transition housings, wherein the asymmetrical transition housings expand vertically and horizontally taken with reference to the rotational axis of the dividing rotors, and wherein a common frontal dividing wedge is associated with the two asymmetrical transition housings to supply crop to the dividing rotors such that the crop is uniformly distributed around the periphery due to the asymmetric widening of the two asymmetrical transition housings.

These aspects are not meant to be all encompassing, but are merely a sampling of the numerous aspects and features of this invention.

BRIEF DESCRIPTION OF THE DRAWINGS

Reference is now made to the drawings, which illustrate the best known mode of carrying out the invention and wherein the same reference characters indicate the same or similar parts throughout the views.

FIG. 2 is a perspective view of transition and dividing housings;

FIG. 3 is a top view of transition housings as illustrated in FIG. 1;

FIG. 4 is a frontal view of transition housings as illustrated in FIG. 1; and

DETAILED DESCRIPTION

Figure 1:
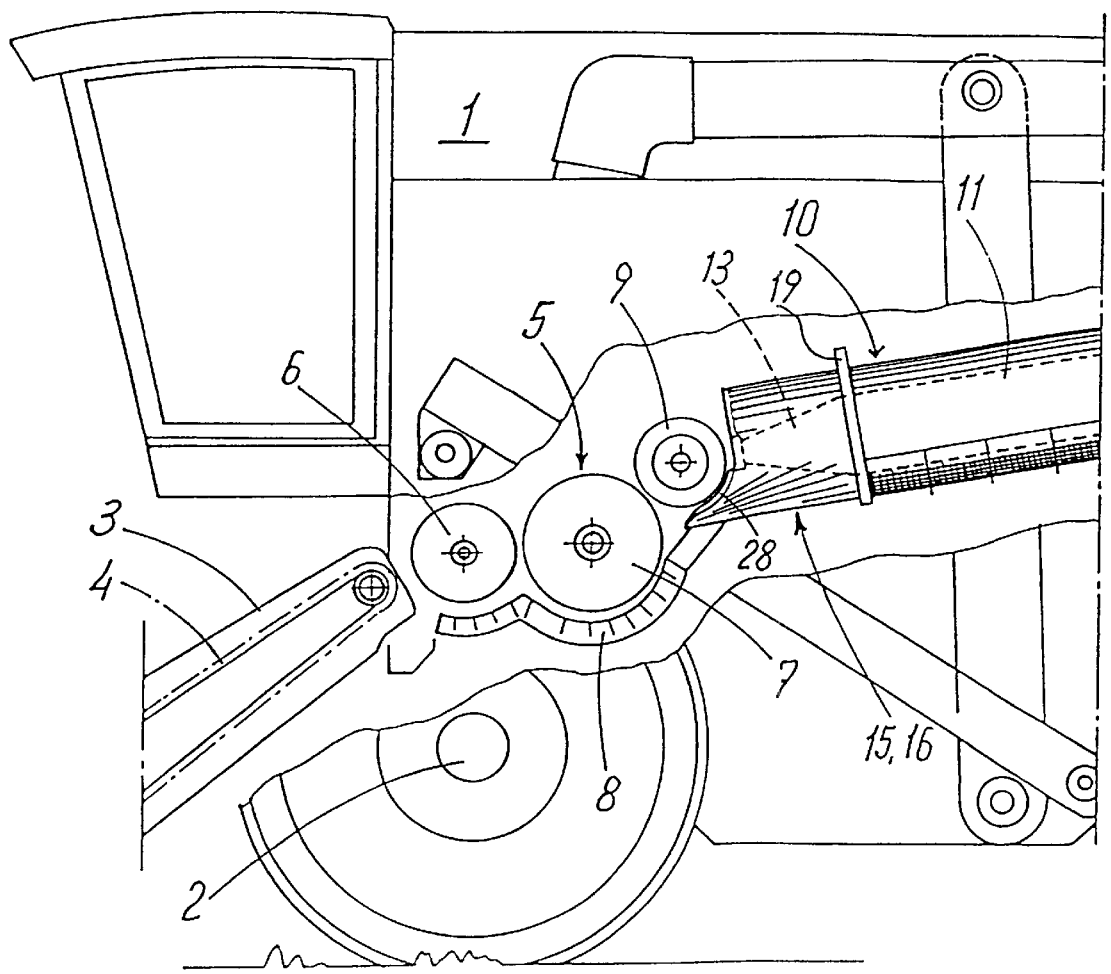
FIG. 1 is a partial side sectional view of a combine harvester.

The invention relates to a self-propelled combine harvester having a front crop attachment (not shown) and a following feed rake (not shown) for harvesting crop. FIG. 1 illustrates a thresher housing 1. A feed channel 3 incorporating a chain conveyor 4 is articulated to the front of the thresher housing 1 proximate to main axle 2. The harvested crop reaches an intermediate or frontal disposed tangential threshing device 5 via the feed channel 3. The harvested crop is divided into two sub-streams either directly or through the tangential threshing device 5. The thresher housing 1 has a front drum 6 for receiving and moving the harvested crop to a main threshing drum 7. A concave 8 is located below the front drum 6 and the main threshing drum 7. A feed drum 9 is located subsequent to the tangential threshing device 5. The feed drum 9 is arranged above the outlet end of the concave 8, but the feed drum 9 axis is parallel to the front drum 6 and the main threshing drum 7 axis. The feed drum 9 receives and moves the harvested crop mixture of grain, straw and chaff to a front face of an axial dividing device 10.

Referring to both FIGS. 1 and 2, the axial dividing device 10 has two cylindrical dividing housings 11 spaced mutually apart, and guide elements 12 mounted along sections of the inner walls of the two cylindrical dividing housings 11. The guide elements 12 are batten-like or strip-like. Dividing rotors 13 are operatively mounted co-axially within the two cylindrical dividing housings 11. Feed elements 14 are operatively connected to the dividing rotors 13 and describe a continuous cylindrical curve. The feed elements 14 extend the length of the dividing rotors 13 contained within the dividing housings 11.

Figure 5:
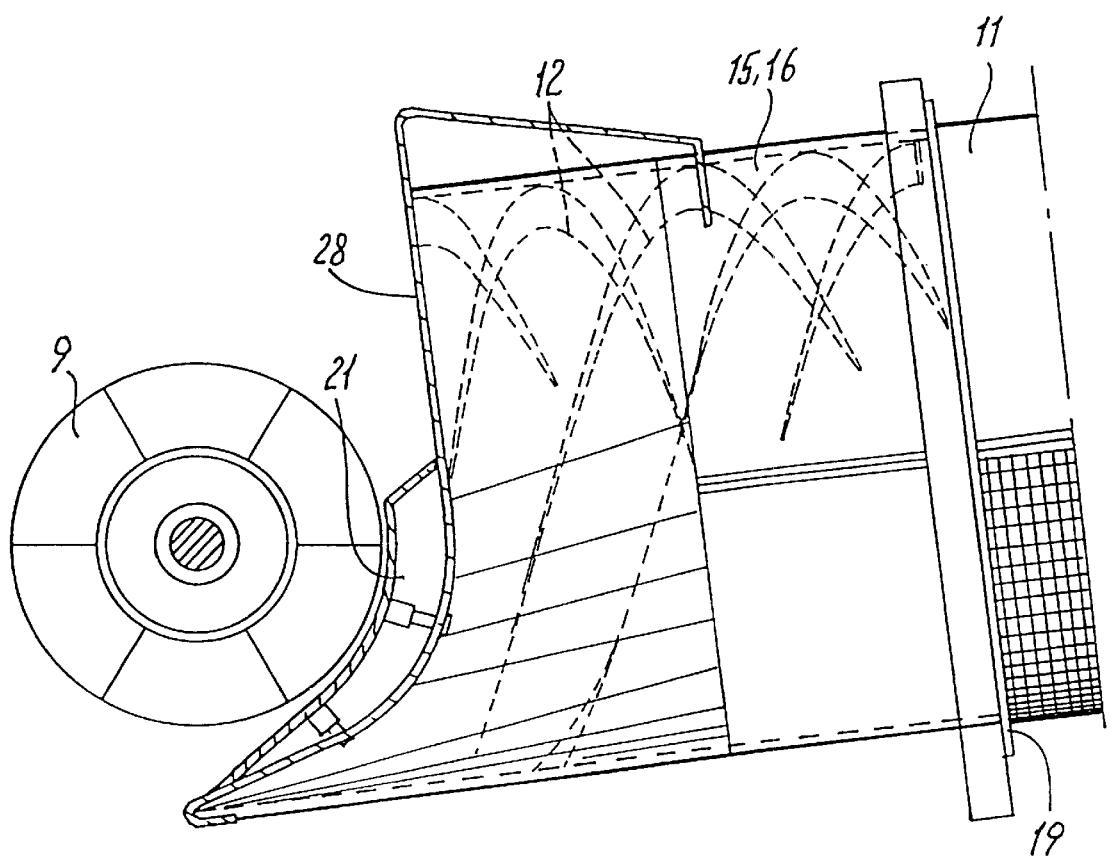
FIG. 5 is a sectional side view of transition and dividing housings taken along the line V—V in FIG. 3.

FIGS. 2 and 5 illustrate two transition housings 15, 16 abut the front ends of the two cylindrical dividing housings 11. Rear portions of the two transition housings 15, 16 are interconnected to the dividing housings 11 by a plate 19 having two passage openings 17, 18. The front inlet regions of the transition housings 15, 16 are interconnected by means of a spade-like curved front plate 28. The front plate 28 extends over the full width of the feed drum 9.

FIGS. 3 and 4 illustrate the dividing rotors 13 incorporating the feed elements 14 tat extend up to the frontal region of the two cylindrical dividing housings 11 or transition housings 15, 16. FIG. 4 illustrates the dividing rotors 13 operatively connected to the front plate 28 in the frontal region by support members 20. A dividing wedge 21, which has an angle that continuously increases from bottom to top, is located in the central area of the front plate 28 as illustrated in FIG. 5.

FIGS. 2, 3 and 4 illustrate the configuration of the transition housings 15, 16. The transition housings 15, 16 are asymmetrical and expand vertically and horizontally at their input ends to ensure uniform and trouble-free transfer of the crop to the dividing device. The transition housings 15, 16 have a first distance A, between each of axes of rotation 22 and a base 23, less than a second distance B between the axes of rotation 22 and a highest point 24 of an upper covering 25 of the transition housings 15, 16. A fourth lateral distance D, between the axes of rotation 22 and inner spatial boundaries 26, is less than a third distance C between the axes of rotation 22 and outer spatial boundaries 27. The two cylindrical dividing housings 11 of the dividing device 10 are asymmetrically and expand vertically and horizontally at the inlet ends to ensure uniform and trouble-free transfer of the crop to the dividing device.

What is claimed is:

1. A self-propelled combine harvester comprising:
   a feed channel to transport a stream of harvested crop;
   a threshing device operatively attached to said feed channel to thresh said stream of harvested crop;
   an axial dividing device including at least two cylindrical dividing housings, having inner walls and mutually spaced, which receives said threshed stream of harvested crop from said threshing device;
   guide elements mounted to each of said inner walls of each said cylindrical dividing housing, wherein each said cylindrical dividing housing includes an inlet, an outlet and an inner circumference; and
   a driveable dividing rotor, having an axis of rotation and a length, located within each of said cylindrical dividing housings and having a feed element mounted thereon, an asymmetrical transition housing, and wherein said axis of rotation of each said driveable dividing rotor is vertically and horizontally eccentric with respect to a center point of said inner circumference of each said transition housing.

2. The self-propelled combine harvester according to claim 1, wherein said at least two cylindrical dividing housings are adjacent to the transition housing.

3. The self-propelled combine harvester according to claim 1, wherein said inner circumference of each said cylindrical dividing housing is greater at said inlet than said outlet.

4. The self-propelled combine harvester according to claim 1, wherein each said feed element is curved and cylindrical.

5. The self propelled combine harvester according to claim 1, wherein each said feed element extends the length of said driveable dividing rotor contained within the dividing housing.

6. The self-propelled combine harvester according to claim 2, wherein said transition housing includes a base, length, inner spatial boundary, outer spatial boundary, and a first distance between said axis of rotation of said driveable dividing rotor and said base that is less than a second distance between said axis of rotation of said driveable dividing rotor and a highest point of an upper covering of said transition housing.

7. The self-propelled combine harvester according to claim 6, further including a vertical central plane of said dividing rotor in a base region of said two cylindrical dividing housings and a fourth distance between said axis of rotation of each said driveable dividing rotor and each said inner spatial boundary of each said transition boundary is less than a third distance between said axis of rotation of each said driveable dividing rotor and each said outer spatial boundary of each said transition boundary.

8. The self-propelled combine harvester according to claim 6, further including front inlet regions and a spade-like curved front plate, wherein said transition housings are mutually interconnected to said inlet regions by said common spade-like curved front plate having two passage openings, wherein said common spade-like curved front plate is proximate to and receives the stream of harvested crop from a feed drum.

9. The self-propelled combine harvester according to claim 1, further including a front plate, having a central portion, wherein each said dividing rotor is operatively connected to said front plate and a dividing wedge operatively connected to said front plate, wherein said dividing wedge has an angle that continuously increases from bottom to top located on said central portion of said front plate.

10. A self-propelled combine harvester comprising:
    a feed channel to transport a steam of harvested crop;
    a threshing device operatively attached to said feed channel to thresh said stream of harvested crop;
    an axial dividing device including two cylindrical dividing housings, having inner walls and mutually spaced, which receives said threshed stream of harvested crop from said threshing device;
    guide elements mounted to each of said inner walls of said cylindrical dividing housing, wherein each said cylindrical dividing housing includes an inlet, an outlet and an inner circumference;
    a driveable dividing rotor, having an axis of rotation and a length, located within each of said cylindrical dividing housings and having a feed element mounted thereon, an asymmetrical transition housing, and wherein said axis of rotation of each said driveable dividing rotor is vertically and horizontally asymmetrically positioned with respect to a center point of said inner circumference of each said transition housing; and
    a dividing wedge is operatively connected between said two cylindrical dividing housings.

11. The self-propelled combine harvester according to claim 10, wherein the transition housing that is adjacent to said two cylindrical dividing housings further includes a base, length, inner spatial boundary, outer spatial boundary, and a first distance between said axis of rotation of said driveable dividing rotor and said base that is less than a second distance between said axis of rotation of said driveable dividing rotor and a highest point of an upper covering of said transition housing.

12. The self-propelled combine harvester according to claim 11, further including a vertical central plane of said dividing rotor in a base region of said two cylindrical dividing housings and a fourth distance between said axis of rotation of each said driveable dividing rotor and each said inner spatial boundary of each said transition boundary is less than a third distance between said axis of rotation of each said driveable dividing rotor and each said outer spatial boundary of each said transition boundary.

13. The self-propelled combine harvester according to claim 11, further including front inlet regions and a spade-like curved front plate, wherein said transition housings are mutually interconnected to said inlet regions by said common spade-like curved front plate having two passage openings, wherein said common spade-like curved front plate is proximate to and receives the stream of harvested crop from a feed drum.

14. The self-propelled combine harvester according to claim 10, further including a front plate, having a central portion, wherein each said dividing rotor is operatively connected to said front plate and the dividing wedge operatively connected to said front plate, wherein said dividing wedge has an angle that continuously increases from bottom to top located on said central portion of said front plate.

15. A self-propelled combine harvester comprising:

a feed channel to transport a stream of harvested crop;

a threshing device operatively attached to said feed channel to thresh said stream of harvested crop;

an axial dividing device including at least two cylindrical dividing housings, having inner walls and mutually spaced, which receives said threshed stream of harvested crop from said threshing device;

guide elements mounted to each of said inner walls of each said cylindrical dividing housing, wherein each said cylindrical dividing housing includes an inlet, an outlet and an inner circumference; and a driveable dividing rotor, having an axis of rotation and a length, located within each of said cylindrical dividing housings and having a feed element mounted thereon, wherein said axis of rotation of each said driveable dividing rotor is asymmetrically positioned with respect to said inner circumference of each said cylindrical dividing housing, wherein said at least two cylindrical dividing housings are adjacent to a transition housing, wherein said transition housing includes a base, length, inner spatial boundary, outer spatial boundary, and a first distance between said axis of rotation of said driveable dividing rotor and said base that is less than a second distance between said axis of rotation of said driveable dividing rotor and a highest point of an upper covering of said transition housing, and wherein said second distance is constant over said length of each said transition housing.

16. A self-propelled combine harvester comprising:

a feed channel to transport a stream of harvested crop;

a threshing device operatively attached to said feed channel to thresh said stream of harvested crop;

an axial dividing device including two cylindrical dividing housings, having inner walls and mutually spaced, which receives said threshed stream of harvested crop from said threshing device;

wherein each said cylindrical dividing housing includes an inlet, an outlet and an inner circumference;

a driveable dividing rotor, having an axis of rotation and a length, located within each of said cylindrical dividing housings and having a feed element mounted thereon, wherein said axis of rotation of each said driveable dividing rotor is asymmetrically positioned with respect to said inner circumference of each said cylindrical dividing housing; and a transition housing that is adjacent to said two cylindrical dividing housings, the dividing housing includes a base, length, inner spatial boundary, outer spatial boundary, and a first distance between said axis of rotation of said driveable dividing rotor and said base that is less than a second distance between said axis of rotation of said driveable dividing rotor and a highest point of an upper covering of said transition housing, wherein said second distance is constant over said length of each said transition housing.

* * * * *